May 16, 1967     P. VOELSKOW     3,319,673
MACHINE FOR PRODUCING WOOD CHIPS
Filed Sept. 21, 1964     5 Sheets-Sheet 1

INVENTOR
PETER VOELSKOW
BY Karl F. Ross
AGENT

May 16, 1967  P. VOELSKOW  3,319,673
MACHINE FOR PRODUCING WOOD CHIPS
Filed Sept. 21, 1964  5 Sheets-Sheet 2

INVENTOR
PETER VOELSKOW
BY Karl J. Ross
AGENT

May 16, 1967  P. VOELSKOW  3,319,673
MACHINE FOR PRODUCING WOOD CHIPS
Filed Sept. 21, 1964  5 Sheets-Sheet 3

INVENTOR
PETER VOELSKOW
BY Karl J. Ross
AGENT

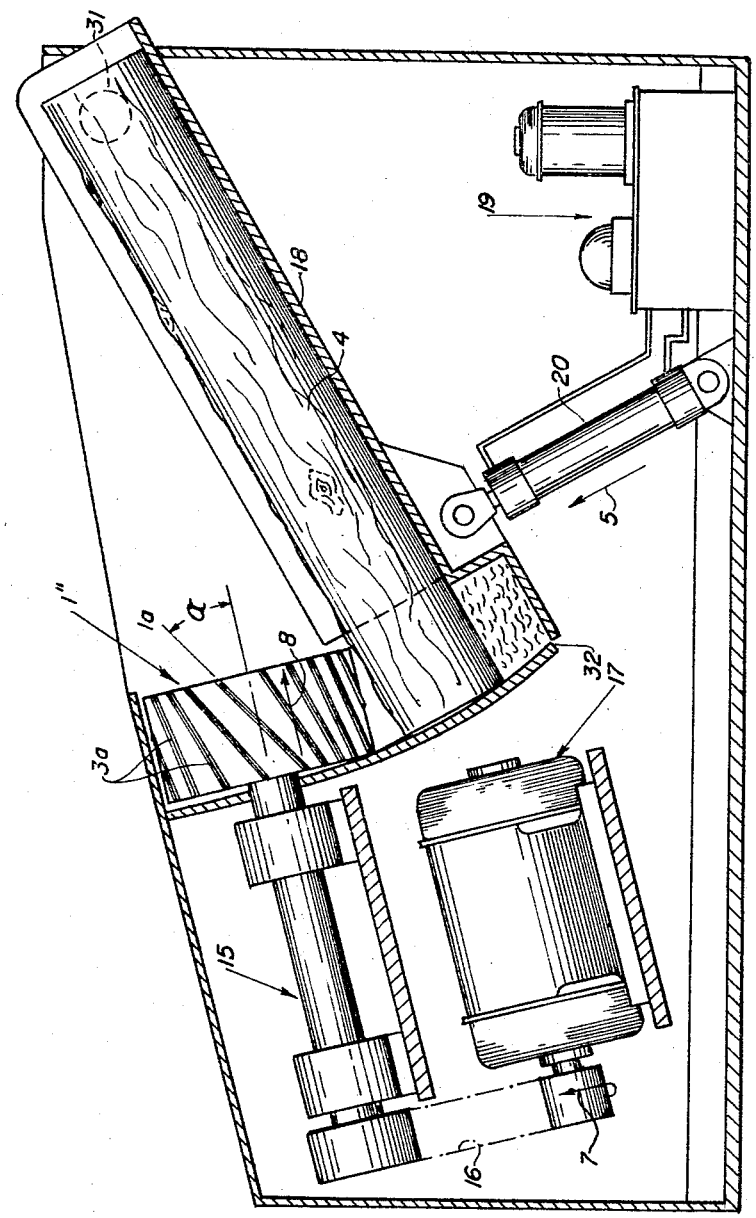

May 16, 1967 P. VOELSKOW 3,319,673
MACHINE FOR PRODUCING WOOD CHIPS
Filed Sept. 21, 1964 5 Sheets-Sheet 5

INVENTOR
PETER VOELESKOW
BY Karl J. Ross
AGENT

United States Patent Office 3,319,673
Patented May 16, 1967

3,319,673
MACHINE FOR PRODUCING WOOD CHIPS
Peter Voelskow, Hildesheim, Germany, assignor to Hombak Maschinenfabrik KG., Bad Kreuznach, Germany, a corporation of Germany
Filed Sept. 21, 1964, Ser. No. 397,908
Claims priority, application Germany, May 16, 1964, H 52,712
10 Claims. (Cl. 144—172)

My present invention relates to a machine for producing wood chips by the action of rotating cutting tools upon a log progressively fed toward the cutting surface of the tool.

The general object of this invention is to provide means in such machine for producing chips that are substantially smooth and free from surface irregularities, e.g. as required for the manufacture of high-grade fiberboard sheets and other products wherein the chips are compacted and bonded to one another with the aid of a suitable binder.

I have found, in accordance with this invention, that smooth and regular chips can be produced with the aid of a scraping tool having a substantially cylindrical body rotatable about the cylinder axis, this body carrying at least one blade but preferably a set of blades which extend skew to said axis along the periphery of the body. A suitable support holds the log to be worked on at an arcute angle to the cylinder axis in such manner that a part of this log lies in the orbit of the rotating blade or blades, the log being progressively displaceable on its support toward the tool axis so that each oncoming blade shaves off a new chip of predetermined thickness. More particularly, the direction of rotation of the tool about its axis is so chosen that the point of contact between each blade and the log shifts in the direction of the vertex of the acute angle included between the log and the tool axis.

The feeding of the log toward the tool may be carried out in various ways, e.g. longitudinally or transversely of the grain of the wood. If the angle of attack included between the tool axis and the log is small and if a large face of the log is to be exposed to the cutting action of the blades, the tool body will be elongated and the blades would have to be distinctly curved so that their shaping may involve difficulties. For this reason I prefer, in the case of an elongated tool, to subdivide the tool today into a plurality of axially adjoining cylinder sections each with its own set of relatively short cutting elements extending along ridge lines which appear straight when projected upon an axial plane, the angle included between these ridge lines and the tool axis being substantially the same on each section.

The invention will be described in greater detail with reference to the accompanying drawing in which:

FIG. 4 is a sectional elevation, similar to FIG. 2, of another embodiment;

Figure 1:
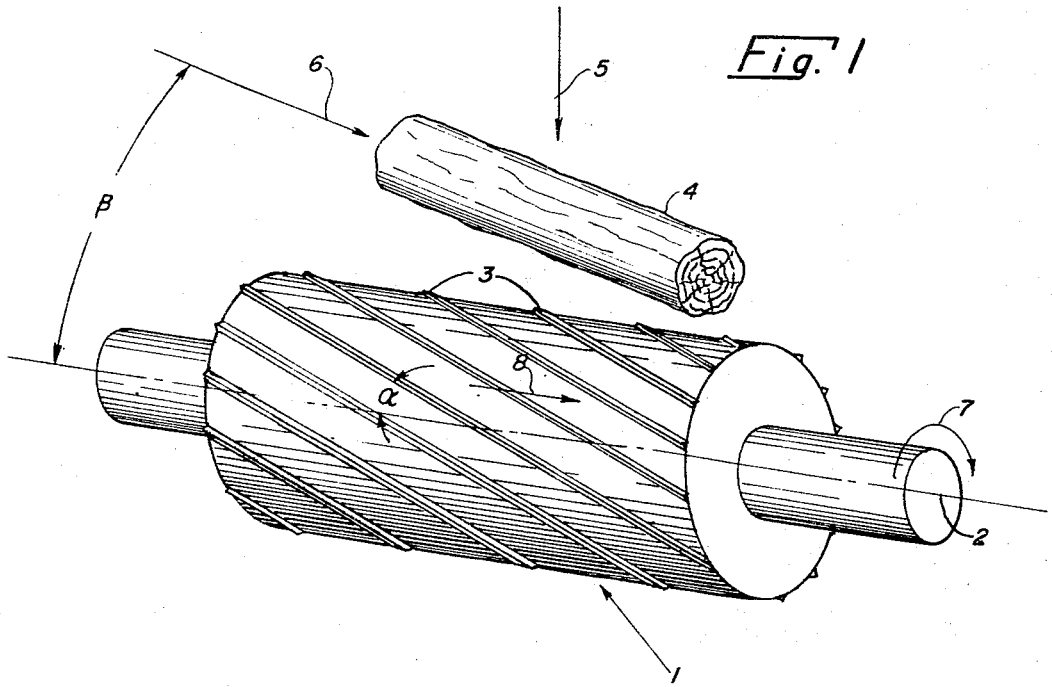
FIG. 1 is a perspective view illustrating, somewhat diagrammatically, the principles of operation of a machine according to my invention.

Reference will first be made to FIG. 1 where I have shown a scraping tool 1 according to my invention, this tool having a cylindrical body with an axis 2 and with a set of peripheral blades 3 equispaced around its cylindrical surface. Each blade 3 extends skew to the axis 2, its projection upon an axial plane including an angle α with the axis; a log 4 is so disposed adjacent the tool 1 that its own axis, located in an axial plane of the tool, includes an angle β with axis 2.

Upon rotation of the tool 1 about axis 2 in the direction of arrow 7, i.e. clockwise as viewed in FIG. 1, and upon a feeding of log 4 toward the tool 1, either in transverse direction (arrow 5) or in longitudinal direction (arrow 6), the right-hand end of log 4 will enter the orbit of the blades 3 so that this end of the log will progressively be comminuted by the rotating blades. It should be noted that, according to an important feature of my invention, the sense of rotation of tool 1 (arrow 7) is so chosen with reference to the direction of blades 3 that the point of contact between each blade and the log will shift in the direction of arrow 8, i.e. toward the vertex of angle β.

Figure 2:
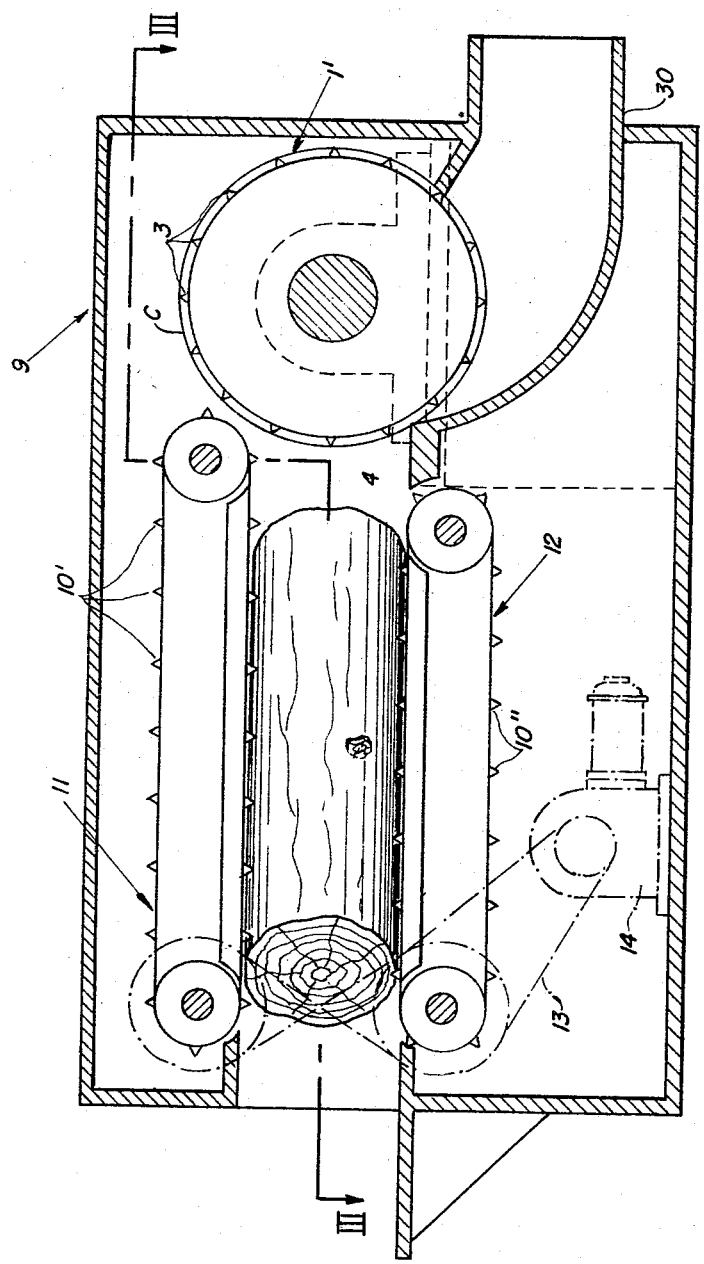
FIG. 2 shows, in sectional elevation, a machine embodying the principles explained in connection with FIG. 1.
Figure 3:
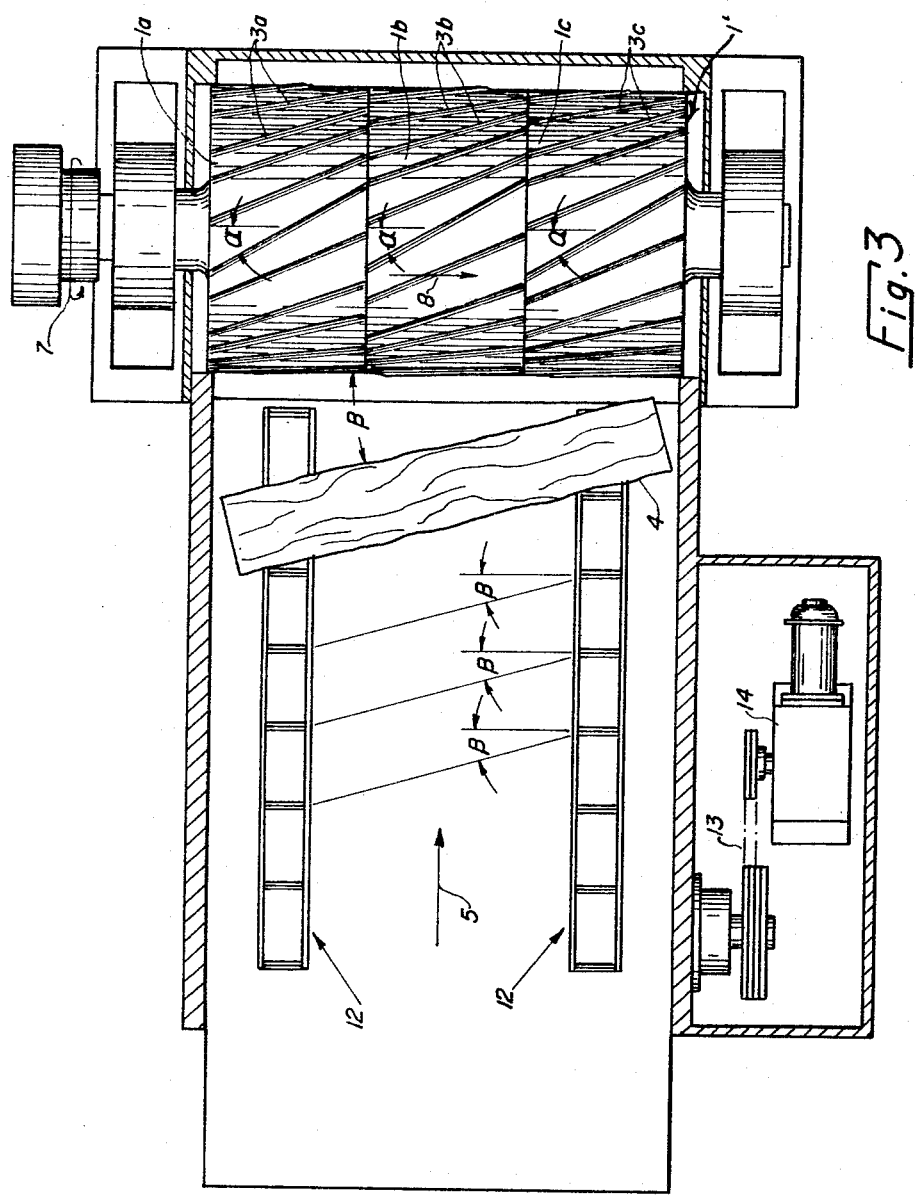
FIG. 3 is a sectional plan view taken on the line III—III of FIG. 2.

In FIGS. 2 and 3 I have shown a machine housing 9 in which a tool 1' is journaled for rotation about a horizontal axis, this tool being generally similar to tool 1 of FIG. 1 except that its body is subdivided into three cylindrical sections 1a, 1b, 1c. The blades of the tool are similarly subdivided into knife edges 3a, 3b, 3c, each spanning a respective cylinder section, a motor (not shown) serving to rotate the tool 1' in the direction previously described as will be apparent from arrows 7 and 8 which have the same significance as in FIG. 1. The knife edges 3a, 3b, 3c appear as straight lines when projected upon an axial plane (FIG. 3) even though, as seen in FIG. 2, they lie on a cylinder surface C and are therefore of constant height, the same as the helicoidal blades 3 of FIG. 1. It will also be seen that the blades of each section 1a, 1b, 1c include, in projection, the same angle α with the tool axis, adjoining blades 3a, 3b, 3c thus defining a broken line approximating the curvature of the continuous blades 3 of FIG. 1.

FIGS. 2 and 3 also show two conveyor parts 11 and 12 provided with spikes 10', 10" which bite into the log 4 from above and from below, respectively, these conveyor pairs being driven in unison via a transmission 13 from a motor 14 to advance the log 4 toward the tool 1' as indicated by the arrow 5 in FIG. 3. The angle β remains constant during this advance and, as shown, has a magnitude between about 10° and 30°.

The modified arrangement of FIG. 4 comprises a housing 21 wherein an axially foreshortened tool 1" represented by a single cylinder section 1a of the tool of the preceding embodiment is rotatable about an inclined axis. Tool 1" is journaled in bearings 15 and driven, in the direction of arrow 7, by a transmission 16 from a motor 17. The log 4 is supported in an upwardly open trough 18 which is fulcrumed at 31 for swinging in a vertical plane and gives access to the tool 1" for progressive shopping of the left-hand end of log 4 as the trough 18 is swung upwardly, in the general direction of arrow 5, by a hydraulic jack 20 to which a working fluid is supplied by a controller 19. In this case, as will be apparent, the angle β between the tool axis and the grain of the wood decreases progressivley from its maximum value seen in FIG. 4. Whenever the tool 1" has cut completely across the log 4, jack 20 lowers the trough 18 to its initial position to allow the remainder of log 4 to slide forward, under its own weight or with the aid of supplemental feed means not shown, whereupon the cycle is repeated. At 32 there is again shown a receptacle for the produced chips.

Figure 5:
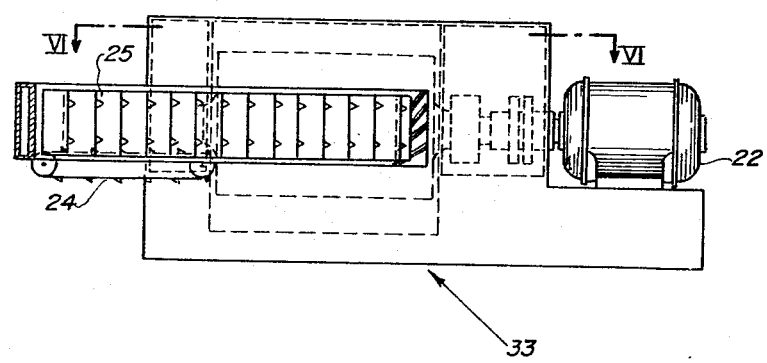
FIG. 5 is a side-elevational view of a further modification of the machine shown in FIGS. 2 and 3.
Figure 6:
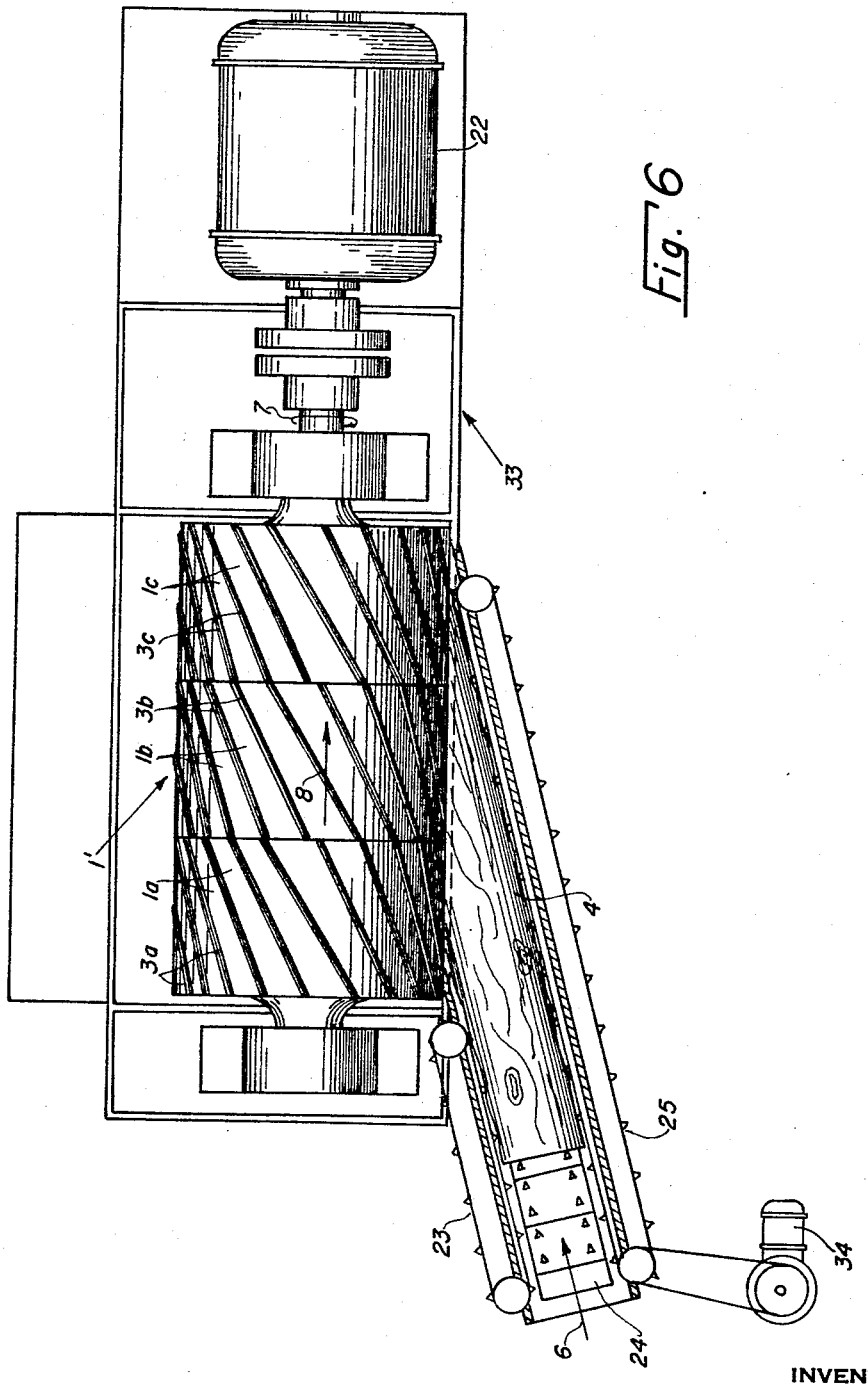
FIG. 6 is a sectional view taken on the line VI—VI of FIG. 5.

In FIGS. 5 and 6 I have shown a laterally open machine housing 33 in which a motor 22 rotates the aforedescribed tool 1' about a horizontal axis (arrow 7). A set of conveyors 23, 24 and 25, driven in synchronism by a motor 34, engage the log 4 on three sides to feed it in the direction of arrow 6 toward the tool 1'. It will be understood that drive motor 34 needs to be directly coupled with only one of these conveyors, such as the chain 25, since synchronization between these conveyors is assured by the engagement of their respective spike formations with the log 4.

The described arrangements invariably produce smooth regular shavings eminently suitable for incorporation in fiberboard plates and other structural elements. Modifications of the systems specifically disclosed are, of course, possible in light of the foregoing teachings without departing from the spirit and scope of my invention as defined in the appended claims.

I claim:
1. A machine for producing wood chips from a log, comprising a tool with a substantially cylindrical body rotatable about its axis, blade means of constant height extending skew to said axis along the periphery of said body, supporting means adjacent said body for holding a log at an acute angle to said axis with a part of said log in the orbit of said blade means and with freedom of progressive displacement of said part toward said axis, and unidirectional drive means for rotating said body about said axis in such a sense as to shift the point of contact between said blade means and said log in the direction of the vertex of said angle upon movement of said blade means past said part.

2. A machine for producing wood chips from a log, comprising a tool with a substantially cylindrical body rotatable about its axis, a set of blades of constant height extending skew to said axis along angularly equispaced peripheral lines of said body, supporting means adjacent said body for holding a log at an acute angle to said axis with a part of said log in the orbit of said blades and with freedom of progressive displacement of said part toward said axis, and unidirectional drive means for rotating said body about said axis in such a sense as to shift the point of contact between each blade and said log in the direction of the vertex of said angle upon movement of the blade past said part.

3. A machine as defined in claim 2 wherein said body is subdivided into a plurality of axially adjoining cylinder sections of like diameter, said blades being constituted by ridges of the same height individually spanning said sections and extending at substantially the same acute angle with reference to said axis on each of said sections.

4. A machine for producing wood chips from a log, comprising a tool with a substantially cylindrical body rotatable about its axis, blade means of constant height extending skew to said axis along the periphery of said body, supporting means adjacent said body for holding a log at an acute angle to said axis with a part of said log in the orbit of said blade means and with freedom of progressive displacement of said part toward said axis, unidirectional drive means for rotating said body about said axis in such a sense as to shift the point of contact between said blade means and said log in the direction of the vertex of said angle upon movement of said blade means past said part, and feed means for progressively advancing said log toward said axis.

5. A machine for producing wood chips from a log, comprising a tool with a substantially cylindrical body rotatable about its axis, a set of blades of constant height extending skew to said axis along angularly equispaced peripheral lines of said body, supporting means adjacent said body for holding a log at an acute angle to said axis with a part of said log in the orbit of said blades and with freedom of progressive displacement of said part toward said axis, unidirectional drive means for rotating said body about such said axis in such a sense as to shift the point of contact between each blade and said log in the direction of the vertex of said angle upon movement of the blade past said part, and feed means for progressively advancing said log toward said axis.

6. A machine as defined in claim 5 wherein said feed means comprises at least one conveyor having formations engageable with the surface of said log.

7. A machine as defined in claim 6 wherein said conveyor extends substantially transversely to said axis.

8. A machine as defined in claim 6 wherein said conveyor extends in the direction of said acute angle with reference to said axis.

9. A machine for producing wood chips from a log, comprising a tool with a substantially cylindrical body rotatable about its axis, a set of blades extending skew to said axis along angularly equispaced peripheral lines of said body, supporting means adjacent said body for holding a log at an acute angle to said axis with a part of said log in the orbit of said blades and with freedom of progressive displacement of said part toward said axis, drive means for so rotating said body about said axis as to shift the point of contact between each blade and said log in the direction of the vertex of said angle upon movement of the blade past said part, and feed means for progressively advancing said log toward said axis, said supporting means comprising an upwardly open trough adapted to receive said log.

10. A machine as defined in claim 9 wherein said trough is swingable in a substantially vertical plane about a fulcrum remote from said body, said feed means including mechanism for progressively swinging said trough about said fulcrum.

References Cited by the Examiner

UNITED STATES PATENTS

| | | |
|---|---|---|
| 109,199 | 11/1870 | Gilpin. |
| 1,851,156 | 3/1932 | Calahan _____ 144—208 |
| 2,969,816 | 1/1961 | Johnsa _____ 144—221 |

FOREIGN PATENTS 1,166,960  6/1958  France.

WILLIAM W. DYER, JR., *Primary Examiner.*

W. D. BRAY, *Assistant Examiner.*